Patented Apr. 8, 1941

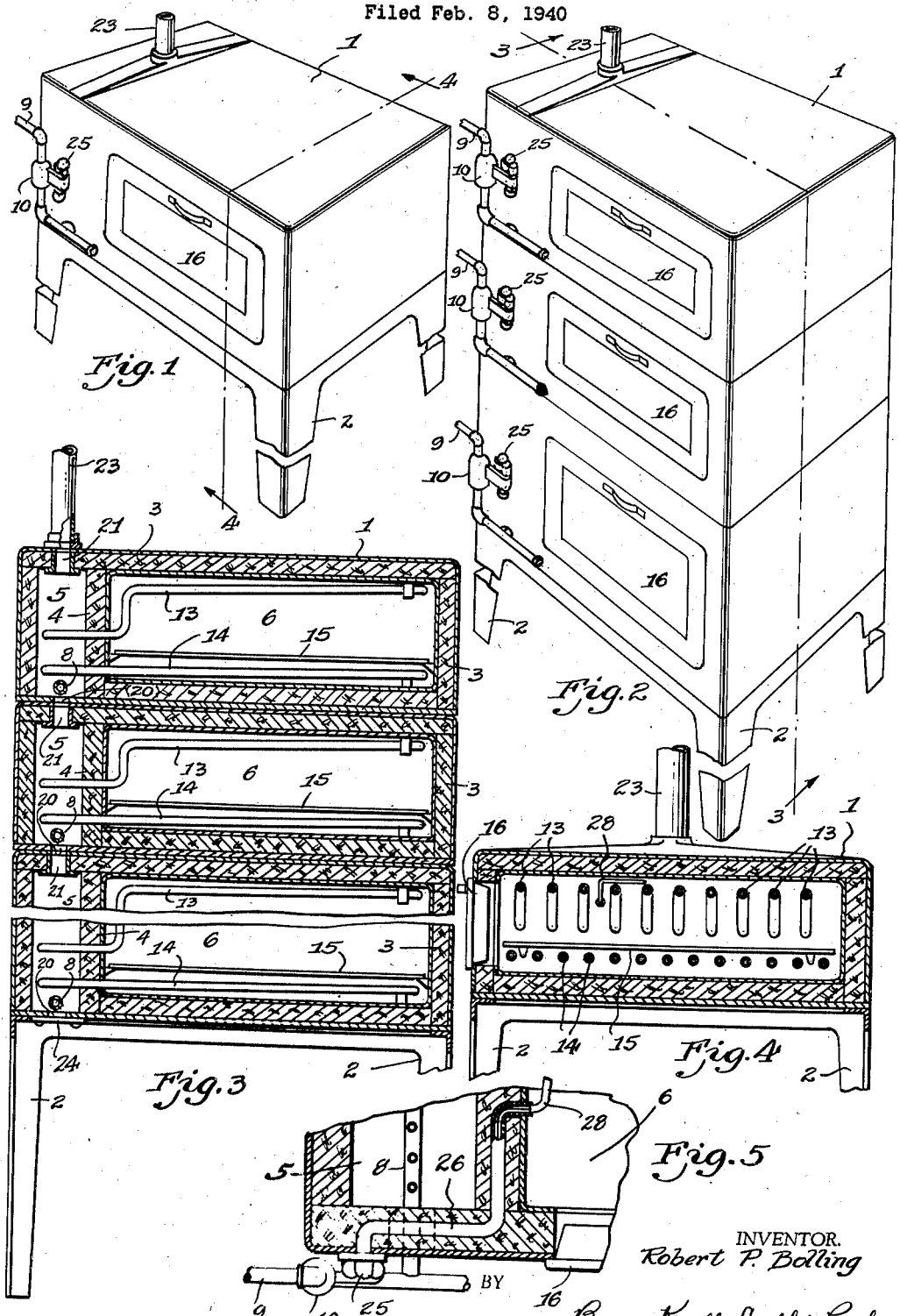

2,237,519

UNITED STATES PATENT OFFICE 2,237,519

BAKE OVEN

Robert P. Bolling, Detroit, Mich.

Application February 8, 1940, Serial No. 317,808

3 Claims. (Cl. 107—62)

This invention relates to improvements in ovens for the baking or roasting of edible goods such as bread, cakes, pies, meats and the like. The principal object of the invention is to provide an oven structure which can be obtained in relatively small units and whereby the oven structure and resultant capacity can be increased by the addition of other units. Ordinarily, ovens for bake goods and of the stem oven type come in large sizes, and the expense thereof and size thereof make such ovens not feasible for establishments such as restaurants, hotels or other eating houses or the like, which desire to or perhaps make a specialty of serving their own bake goods. In accordance with the present invention a small size complete oven unit can be obtained and which can be used for such purposes, and the arrangement is such that the capacity may be increased by the obtaining of one or more additional units. In fact the capacity may be decreased by the dispensing of one or more units. The oven units, in accordance with the invention, are capable of independent operation, to the end that only such number of units may be operated as give the desired capacity, and moreover, the independent operation facilitates the preparation of different types of bake goods in the different units. For example, two or more different types of bake goods requiring different temperatures and times may be prepared simultaneously.

A structure for carrying out the invention is shown in the accompanying drawing wherein:

Fig. 1 is a perspective view of an oven constructed in accordance with the invention.

Fig. 2 is a perspective view illustrating the oven structure embodying several units.

Fig. 3 is a sectional view taken substantially on line 3—3 of Fig. 2 showing some of the interior structure.

Fig. 4 is a sectional view taken substantially on line 4—4 of Fig. 1 showing the interior arrangement.

Fig. 5 is a detail view partly in section illustrating a thermostatic control arrangement.

The oven structure, as shown in Fig. 1, takes the form of a single unit which comprises a compartment or cabinet 1 advantageously supported by legs 2. In Figs. 2 and 3 several of these units are disposed in cooperating relationship. Each unit, as shown in Figs. 3 and 4, is preferably formed of insulating walls 3, and the interior is divided by an insulating wall 4 to thus provide a combustion or fire chamber 5 and a baking chamber or oven 6. The structure shown is arranged for the consumption of a fluid fuel, and accordingly each combustion chamber is equipped in its lower portion with a suitable burner 8. Fuel is led to the burner through a conduit 9 in which may be disposed a valve 10, and as shown in Fig. 2 each unit has its conduit and valve.

Each unit is preferably of the steam tube type of oven, and to this end each is provided with two sets of steam tubes. There is an upper set 13 and a lower set 14 disposed respectively above and below a load supporting shelf 15 for the bake goods. As is known to those versed in this art, these tubes are sealed with a quantity of liquid therein, and are angularly disposed and extend through the insulating partition 4 so that the liquid in condensed form runs to the lower ends in the combustion compartment. The application of heat generates steam or causes the liquid to vaporize and pass throughout the length of the tubes, and thus convey the heat into the oven compartment. The insulating walls 4 are preferably designed to insulate the oven from the direct heat of the combustion chamber so that the temperature in the oven compartment adjacent the combustion chamber will not be materially higher than that at the end remote from the combustion chamber. The bake goods may be placed into the compartments and removed therefrom through suitable doors 16.

These units may be constructed in a similar or substantially identical manner and may be used singly or in multiple. Each unit is provided with an opening 20 in the bottom wall of the combustion chamber and an opening 21 in the upper wall when a unit is used singly. As shown in Fig. 1, a suitable flue 23 may be associated with the opening 21. In this event, the opening 20 is preferably closed by a cap or plate 24. When the units are used in multiple one or more may be placed on top of the lowermost one, as indicated in Fig. 3. In this arrangement the opening 20 of the upper unit aligns with the opening 21 of the lower unit so as to form a flue connecting the combustion chambers. The final outlet flue is placed on the uppermost unit. Thus, as shown in Fig. 3, a flue structure is formed which extends through the several combustion chambers.

In the preferred construction the unit used singly or as the bottom unit in an assembled structure is of a larger capacity than the additional units. This is desirable in that it makes available a large oven for the cooking of roasts or meat or fowl or other goods of exceptionally large size. The availability of additional units of small size gives a greater flexibility to the capacity.

It is preferred, although not necessary, that each unit operate independently as to its fuel supply and temperature. To this end, a control for the fuel may be provided and which is in the nature of a thermostat and comprises a control element 25 operably associated as at 26 with a sensitive element 23 located in the oven compartment. This structure is more or less diagrammatically shown, but it is to be understood that the control element 25 varies the position of the valve 18, depending upon the temperature to which the sensitive element 23 is subjected.

A small operator can obtain one of the oven units and put it to use singly after the manner illustrated in Fig. 1. Due to the small size of the structure it can be obtained economically, and yet an efficient modern steam tube oven is provided. In the event it becomes necessary for the operator to increase the capacity, one or more other units may be obtained, and the units are arranged so that they can be placed one upon the other as indicated. This is facilitated, since the operation requires only the removal of the flue, as shown in Fig. 1, and the attachment of the flue on to the uppermost unit. If any subsequent unit is provided with a closure plate 24, this is to be removed for the alignment of the openings 20 and 21. In use as a multiple unit, different temperatures may be maintained in the different units, or the same temperatures may be maintained, depending upon the requirements of the goods to be baked in each unit. Thus a considerable flexibility is provided for an operator who needs these requirements. One or more of the units may be operated singly at any time. This, of course, represents a saving in fuel since when only a small amount of bake goods is required the heat necessary for a small unit is less than that of a large bake oven.

I claim:

1. An oven structure for bake goods comprising, a plurality of units disposed in superimposed relationship and each comprising upper and lower walls and side walls, a partition in each unit defining at one side thereof a combustion chamber, and defining on the opposite side thereof, an oven compartment for bake goods, a burner for fuel in each combustion compartment, a shelf adapted to support bake goods in each oven compartment, steam tubes extending through the partition of each unit above and below said shelf for transferring heat to the oven compartment, the upper and lower walls of the combustion compartments having openings therein arranged so that the opening in the upper wall of one unit substantially aligns with the opening in the lower wall of the next above unit, whereby a continuous flue formation is provided through the several superimposed combustion chambers, and a final outlet flue associated with the opening in the upper wall of the uppermost unit.

2. An oven structure for bake goods comprising, a plurality of units disposed in superimposed relationship and each comprising upper and lower walls and side walls, a partition in each unit defining at one side thereof a combustion chamber, and defining on the opposite side thereof, an oven compartment for bake goods, a burner for fuel in each combustion compartment, steam tubes extending through the partition of each unit for transferring heat to the oven compartment, the upper and lower walls of the combustion compartments having openings therein arranged so that the opening in the upper wall of one unit substantially aligns with the opening in the lower wall of the next above unit, whereby a continuous flue formation is provided through the several superimposed combustion chambers, a final outlet flue associated with the opening in the upper wall of the uppermost unit, means for independently supplying fuel to the burner of each unit, and thermostatic control means associated with each unit for controlling the fuel supplied thereto.

3. An oven structure for bake goods comprising, upper and lower walls and side walls, a partition defining at one side thereof a combustion chamber and defining on the opposite side thereof an oven compartment for bake goods, a burner for fuel in the combustion chamber, a shelf adapted to support bake goods in the oven compartment, steam tubes for transferring heat to the oven compartment extending through the partition and extending under the said shelf and substantially along the top of the oven compartment, the upper wall of the combustion compartment having an opening therein, an outlet flue associated with the said opening and a door on the oven compartment.

ROBERT P. BOLLING.